United States Patent
Line et al.

(10) Patent No.: US 10,173,565 B2
(45) Date of Patent: Jan. 8, 2019

(54) VEHICLE SEAT AND HEADREST WITH DYNAMIC IMPACT ENERGY MANAGEMENT SYSTEM

(71) Applicant: Ford Global Technologies, LLC, Dearborn, MI (US)

(72) Inventors: Johnathan Andrew Line, Northville, MI (US); Christian J. Hosbach, Taylor, MI (US); Rodney Charles Brinker, Eastpointe, MI (US); Richard Joseph Soyka, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 15/157,500

(22) Filed: May 18, 2016

(65) Prior Publication Data

US 2017/0334326 A1  Nov. 23, 2017

(51) Int. Cl.
  *B60N 2/48* (2006.01)
  *B60N 2/68* (2006.01)
  *B60N 2/64* (2006.01)
  *B60N 2/80* (2018.01)
  *B60N 2/888* (2018.01)

(52) U.S. Cl.
  CPC ............. *B60N 2/686* (2013.01); *B60N 2/643* (2013.01); *B60N 2/80* (2018.02); *B60N 2/888* (2018.02); *B60N 2002/899* (2018.02)

(58) Field of Classification Search
  CPC .................................. B60N 2/803; B60N 2/888
  See application file for complete search history.

(56) References Cited

U.S. PATENT DOCUMENTS

| | | | | |
|---|---|---|---|---|
| 3,528,703 A * | 9/1970 | Ohta | ...................... | B60N 2/485 297/391 |
| 4,191,422 A * | 3/1980 | Inasawa | ................... | A47C 7/38 297/391 |
| 5,257,853 A * | 11/1993 | Elton | ................... | B60N 2/4808 297/391 |
| 5,772,280 A * | 6/1998 | Massara | ............... | B60N 2/2222 297/216.12 |
| 6,149,233 A * | 11/2000 | Takei | ................... | B60N 2/4847 297/220 |
| 6,213,548 B1 * | 4/2001 | Van Wynsberghe | ......................... | B60N 2/4864 297/216.1 |

(Continued)

*Primary Examiner* — Kyle J. Walraed-Sullivan
(74) *Attorney, Agent, or Firm* — Vichit Chea; Price Heneveld LLP

(57) ABSTRACT

A vehicle seat includes a seatback with a back panel having a plurality of score lines defining a deflectable upper portion of the back panel. A headrest includes a housing with front and rear covers. The rear cover includes a plurality of score lines defining a deflectable lower portion of the rear cover. A trim ring is coupled between the deflectable upper portion of the seatback and the deflectable lower portion of the rear cover by one or more reinforcement brackets in assembly. The trim ring includes a plurality of notches disposed along a perimeter portion thereof. The notches of the trim ring cooperate to define deflection points of the trim ring along the perimeter thereof. The score lines and the notches of the vehicle seat provide for a dynamic impact energy management system for the seat at a head restraint thereof.

6 Claims, 4 Drawing Sheets

(56) References Cited

U.S. PATENT DOCUMENTS

| | | | | |
|---|---|---|---|---|
| 6,474,733 B1* | 11/2002 | Heilig | B60N 2/4415 | 297/216.12 |
| 6,575,494 B1* | 6/2003 | Heilig | B60N 2/4802 | 280/728.1 |
| 6,899,395 B2* | 5/2005 | Yetukuri | B60N 2/4817 | 297/408 |
| 7,284,290 B1* | 10/2007 | Swezey | A47C 20/027 | 5/630 |
| 7,562,936 B1* | 7/2009 | Veine | B60N 2/4814 | 297/410 |
| 7,926,871 B2* | 4/2011 | Meixner | B60N 2/4885 | 297/216.12 |
| 8,408,645 B2* | 4/2013 | Alexander | B60N 2/862 | 297/216.12 |
| 8,414,078 B2* | 4/2013 | Fujita | B60N 2/485 | 297/391 |
| 8,721,001 B2* | 5/2014 | Li | B60N 2/80 | 297/410 |
| 8,752,894 B2* | 6/2014 | Trimborn | B60N 2/4885 | 297/216.12 |
| 8,833,859 B2* | 9/2014 | Matsushima | B60N 2/4817 | 297/391 |
| 8,851,574 B2* | 10/2014 | Yetukuri | B60N 2/4844 | 297/408 |
| 9,308,844 B2* | 4/2016 | Guenther | B60N 2/4864 | |
| 9,561,742 B2* | 2/2017 | Fey | B60N 2/4817 | |
| 9,656,579 B2* | 5/2017 | Nakata | B60N 2/48 | |
| 9,656,582 B2* | 5/2017 | Komatsubara | B60N 2/4808 | |
| 9,707,871 B2* | 7/2017 | Okamoto | B60N 2/48 | |
| 9,713,973 B2* | 7/2017 | Tachikawa | B60N 2/48 | |
| 2004/0100139 A1* | 5/2004 | Williams | A47C 7/405 | 297/452.31 |
| 2005/0127734 A1* | 6/2005 | Veine | B60N 2/4885 | 297/391 |
| 2005/0253429 A1* | 11/2005 | Veine | B60N 2/4885 | 297/216.1 |
| 2006/0250017 A1* | 11/2006 | Otto | B60N 2/888 | 297/410 |
| 2008/0191522 A1* | 8/2008 | Maeda | B60N 2/888 | 297/216.12 |
| 2009/0267389 A1* | 10/2009 | Otsuka | B60N 2/4228 | 297/216.12 |
| 2009/0315372 A1* | 12/2009 | Tracht | B60N 2/42709 | 297/216.12 |
| 2010/0026061 A1* | 2/2010 | McFalls | B60N 2/4864 | 297/216.12 |
| 2010/0127548 A1* | 5/2010 | Truckenbrodt | B60N 2/4864 | 297/391 |
| 2010/0164272 A1* | 7/2010 | Oota | B60N 2/4817 | 297/410 |
| 2010/0314918 A1* | 12/2010 | Alexander | B60N 2/4861 | 297/216.12 |
| 2013/0270887 A1* | 10/2013 | Matsumoto | B60N 2/4228 | 297/452.34 |
| 2013/0285431 A1* | 10/2013 | Turletti | B60N 2/4873 | 297/391 |
| 2014/0077565 A1* | 3/2014 | Baumgarten | B60N 2/4805 | 297/404 |
| 2014/0183921 A1* | 7/2014 | Hage-Hassan | B60N 2/48 | 297/378.1 |
| 2015/0097408 A1* | 4/2015 | Nakata | B60N 2/48 | 297/391 |
| 2015/0183347 A1* | 7/2015 | Falster | B60N 2/482 | 297/410 |
| 2015/0210191 A1* | 7/2015 | Mizobata | B60N 2/4811 | 297/410 |
| 2015/0283927 A1* | 10/2015 | Velasco | B64D 11/0646 | 297/391 |
| 2016/0121770 A1* | 5/2016 | Takahashi | B60N 2/48 | 297/452.18 |
| 2016/0167551 A1* | 6/2016 | Okamoto | B60N 2/80 | 297/391 |

* cited by examiner

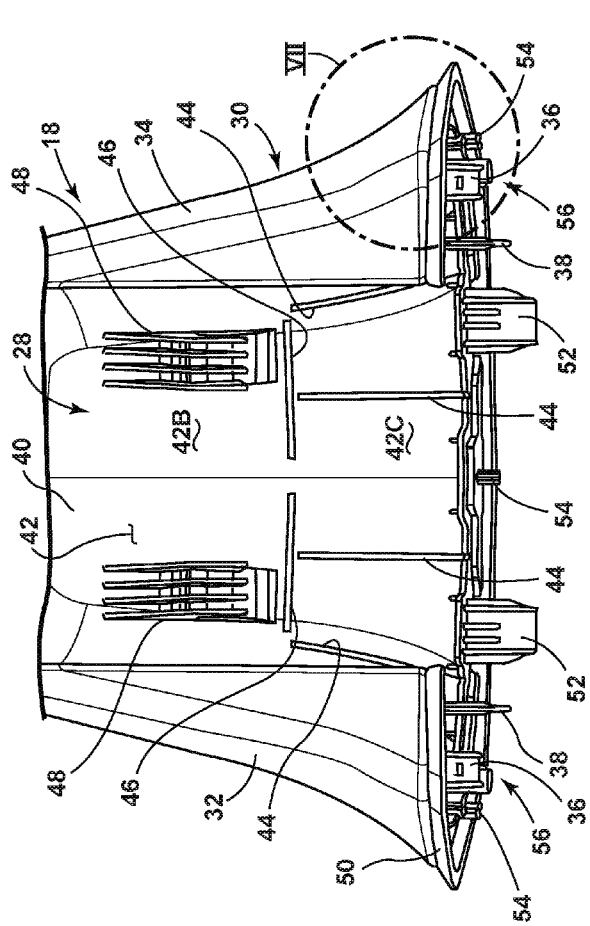
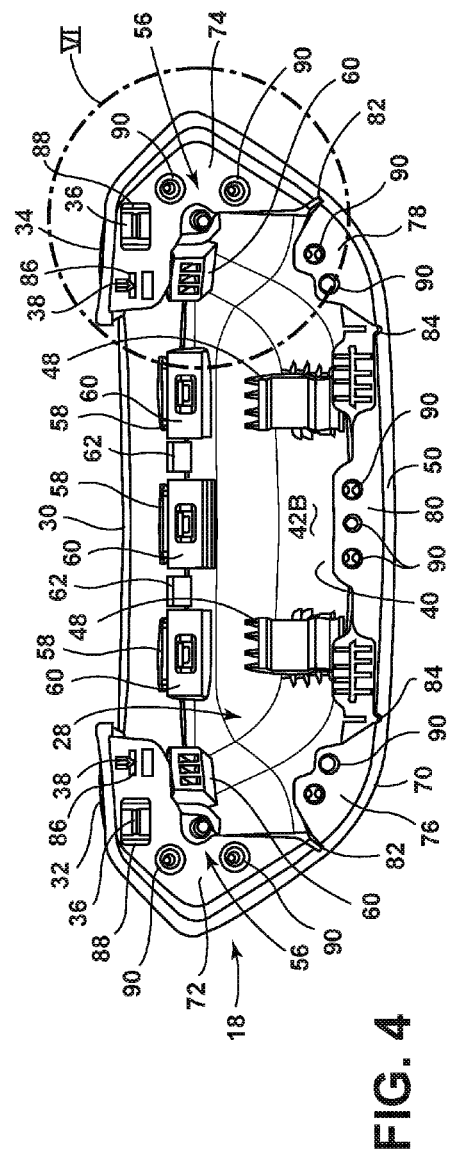
FIG. 3
FIG. 4

VEHICLE SEAT AND HEADREST WITH DYNAMIC IMPACT ENERGY MANAGEMENT SYSTEM

FIELD OF THE INVENTION

The present invention generally relates to a headrest assembly for a vehicle seat, and more particularly, to a headrest assembly having contoured trim components for providing a dynamic impact energy management system.

BACKGROUND OF THE INVENTION

In the automotive industry, a number of headrest designs are available that provide support for vehicle occupants in multiple positions. A headrest assembly can be a point of impact during a dynamic event and a headrest assembly that is configured to absorb energy is desired.

SUMMARY OF THE INVENTION

One aspect of the present invention includes a headrest assembly having a housing with front and rear covers. The rear cover includes a panel having inner and outer surfaces with a plurality of score lines disposed on the inner surface to define a deflectable lower portion of the panel. A trim ring is coupled to the front and rear covers and includes a plurality of notches disposed along a perimeter portion thereof. The notches cooperate to define deflection points of the trim ring along the perimeter thereof.

Another aspect of the present invention includes a vehicle seat having a seatback with a back panel. The back panel includes a plurality of score lines defining a deflectable upper portion of the back panel. A headrest housing includes a rear cover coupled to the back panel. The rear cover includes a plurality of score lines defining a deflectable lower portion of the rear cover. A trim ring is coupled between the deflectable upper portion of the seatback and the deflectable lower portion of the rear cover in assembly.

Yet, another aspect of the present invention includes a vehicle seat having a seatback with a back panel. The back panel includes a plurality of channels disposed on an upper portion of an inner surface to define a deflectable upper portion of the back panel. A headrest housing is coupled to the deflectable portion of the back panel. The headrest housing includes a rear cover and a plurality of channels disposed on a lower portion of an inner surface thereof to define a deflectable lower portion of the rear cover. A trim ring is coupled between the deflectable upper portion of the back panel and the deflectable lower portion of the rear cover by one or more reinforcement brackets.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a front view of the headrest housing of FIG. 2 removed from the back panel;

FIG. 4 is a bottom plan view of the headrest housing of FIG. 3;

DETAILED DESCRIPTION OF THE PREFERRED EMBODIMENTS

Figure 1:
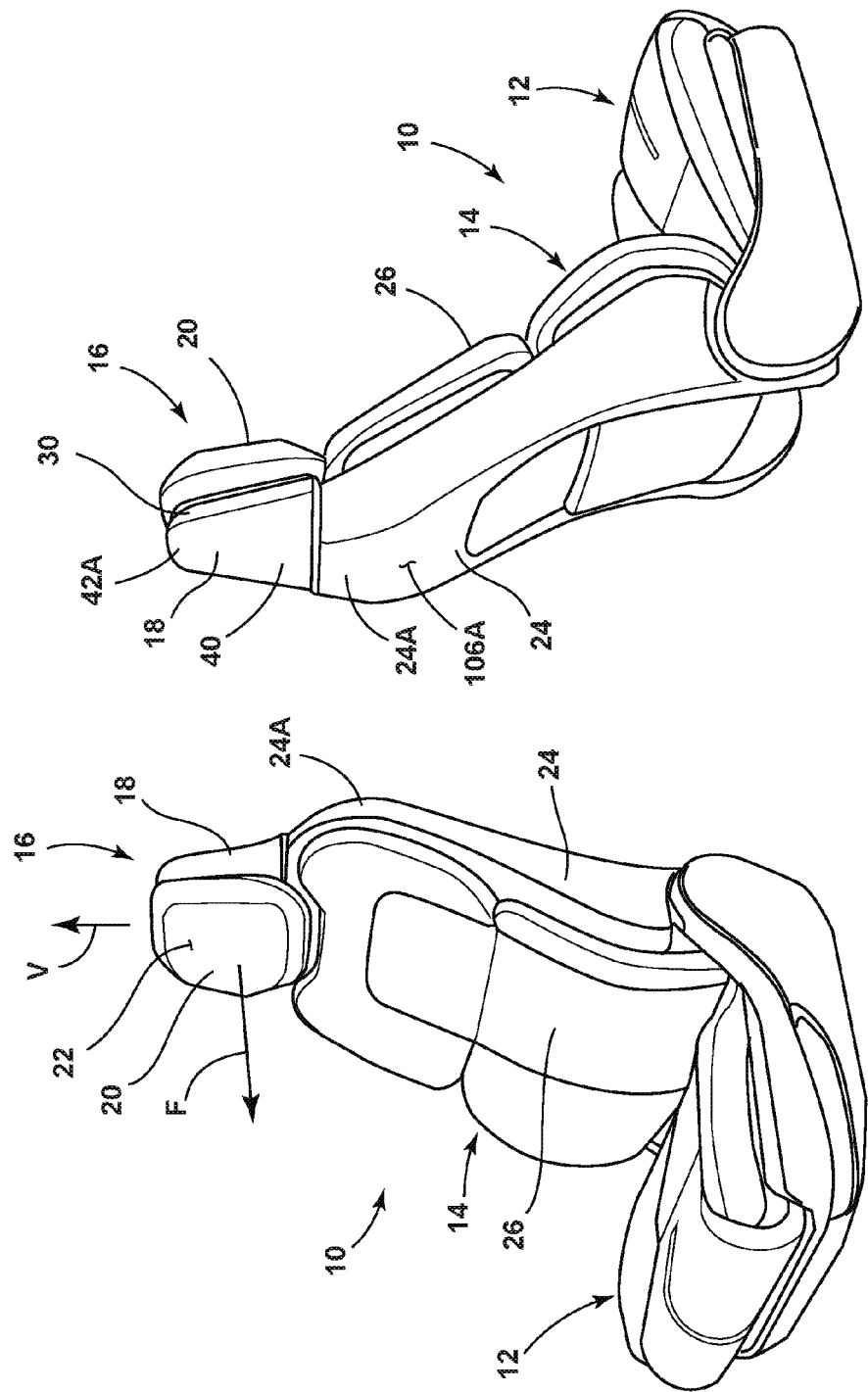
FIG. 1A is a front perspective view of a vehicle seat assembly having a headrest assembly according to one embodiment of the present invention.
FIG. 1B is a rear perspective view of the vehicle seat assembly of FIG. 1A.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a vehicle seat assembly 10 is shown for use within a vehicle interior. The vehicle seat 10 includes a seat member 12 which is coupled to a seatback 14. The seatback 14 includes a headrest assembly 16 mounted thereon. The headrest assembly 16 includes a headrest housing 18 that is a rear housing disposed adjacent to an adjustable headrest bun 20. The headrest bun 20 is contemplated to be a cushioned member configured to support the head of a vehicle occupant seated in the vehicle seat 10. The vehicle seat 10 of FIG. 1A is contemplated to be a driver's side vehicle seat, however, it is contemplated that the headrest assembly 16 of the present invention may be disposed on any vehicle seat within a vehicle, including passenger seats, rear seats, folding seats and third row passenger seat options. As such, the headrest assembly 16 shown in FIG. 1A is not intended to limit the spirit of the invention.

As noted above, the headrest assembly 16 is an adjustable headrest assembly, wherein the headrest bun 20 is contemplated to be adjustable in a forward direction, as indicated by arrow F between extended and retracted positions, as well as a vertical direction, as indicated by arrow V, between raised and lowered positions, relative to the headrest housing 18. In the position shown in FIG. 1A, the headrest bun 20 is contemplated to be in a home position H which correlates to the headrest bun 20 being in a lowered vertical position and a retraced horizontal position, such that the headrest bun 20 is disposed directly in front of the headrest housing 18. Movement of the headrest bun 20 is contemplated to be powered by one or more powered adjustment mechanisms that are substantially concealed by the headrest housing 18 when the headrest bun 20 is in the home position H.

As further shown in FIG. 1A, the headrest bun 20 includes a front surface 22 which may be impacted by a vehicle occupant or another object during a dynamic event. Throughout this disclosure, the term "dynamic event" is used to describe a collision event, such as a rear end or frontend collision. When the front surface 22 is impacted by a vehicle occupant, such as the back of a vehicle occupant's head, the forces of the impact will generally propagate from the headrest bun 20 towards the headrest housing 18. The headrest housing 18 makes up part of an energy management or energy absorption system of the vehicle seat 10 as further described below.

Referring now to FIG. 1B, the seatback 14 of the vehicle seat 10 includes a back panel 24 having an upper portion 24A disposed adjacent to the headrest housing 18 of the headrest assembly 16. As further described below, the back panel 24 of the vehicle seat 10 also includes features of the energy management system of the vehicle seat 10. The seatback 14 includes a cushioned front portion 26 which is configured to support a vehicle occupant in a seated position. The cushioned front portion 26 is configured to couple to the back panel 24 in assembly.

Figure 2:
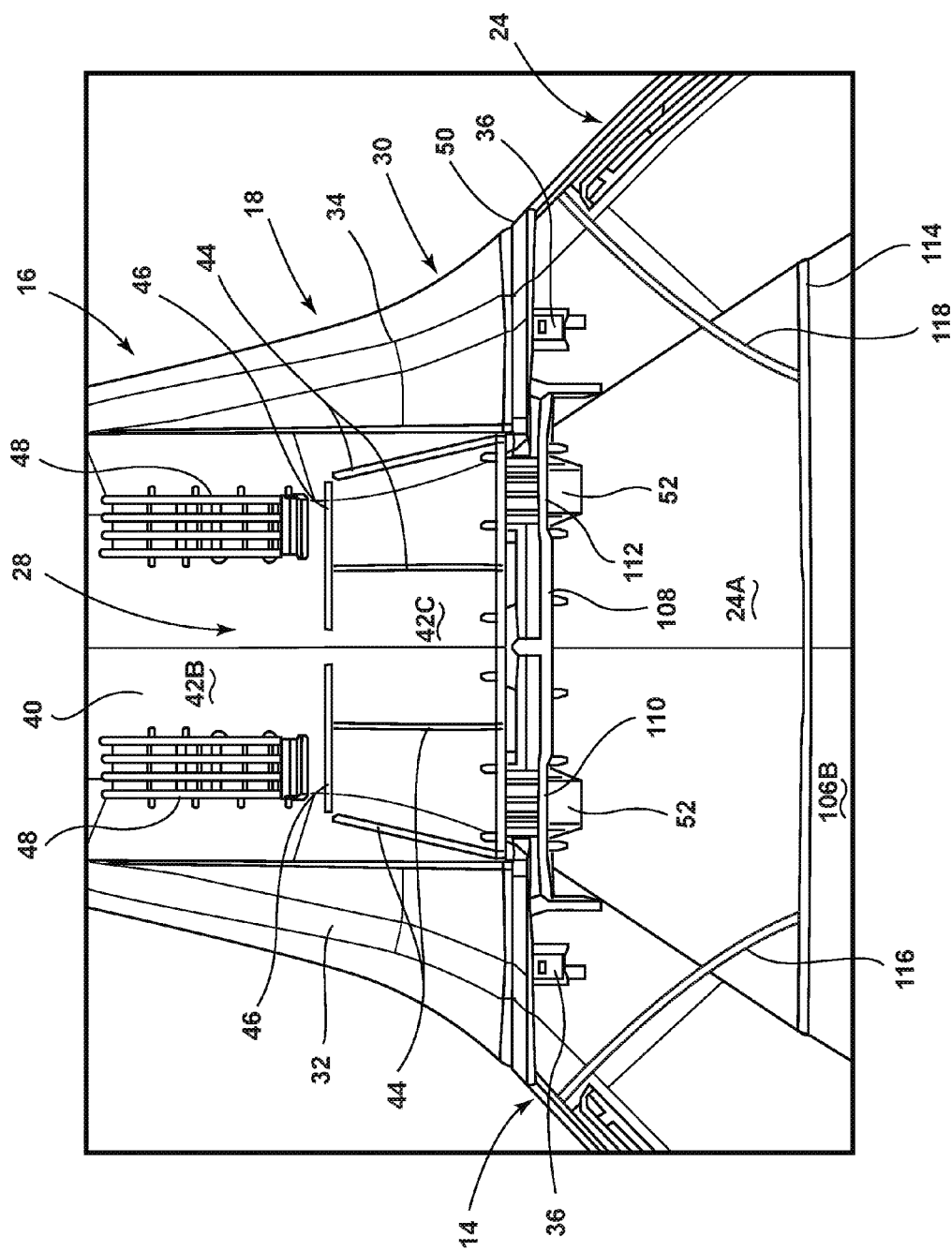
FIG. 2 is a front elevational view of a back panel coupled to a headrest housing.

Referring now to FIG. 2, the back panel 24 is shown having the headrest housing 18 of the headrest assembly 16 coupled thereto. In FIG. 2, the cushioned front portion 26 of the seatback 14 has been removed to show the coupling of the headrest housing 18 to the back panel 24. Further, in FIG. 2, the headrest bun 20 of the headrest assembly 16 has been removed along with a number of adjustment components for the headrest bun 20 to reveal a hollow interior space 28 defined by the headrest housing 18. The interior space 28 is configured to house components, such as a linkage system and telescoping cover assembly, for powering movement of the headrest bun 20 between extended and retracted positions while concealing components provided to drive such movement. As specifically shown in FIG. 2, the headrest housing 18 of the headrest assembly 16 includes a front cover 30 having first and second sides 32, 34, and a rear cover 40. In assembly, the front cover 30 is coupled to the rear cover 40 to define the interior space 28 for housing the various components of the headrest assembly 16. Coupled between the back panel 24 and the headrest housing 18 is a trim ring 50 which may be a plated decorative feature. The coupling of the trim ring 50 to the headrest housing 18 and the back panel 24 is further described below. The back panel 24, front and rear covers 30, 40, and trim ring 50 are all contemplated to be polymeric parts having selectively deflectable portions as further described below.

Referring now to FIG. 3, the trim ring 50 is shown coupled to the headrest housing 18. The rear cover 40 of the headrest housing 18 generally includes a panel 42 having an A-side and a B-side. The A-side is contemplated to be an outer surface 42A shown in the rear perspective view of the vehicle seat 10 in FIG. 1B. The B-side of the panel 42 is shown as inner surface 42B in FIG. 3. On the inner surface 42B, a plurality of score lines 44, 46 are disposed on a lower portion 42C of the panel 42 of the rear cover 40. In the embodiment shown in FIG. 3, the score lines 44 represent substantially vertical score lines, while score lines 46 represent substantially horizontal score lines. As used throughout this disclosure, the term "score lines" is used to identify a scored portion or notched portion of a polymeric part. Specifically, the score lines 44, 46 of the present invention define in-set channels specifically configured to allow for and guide deflection at the score lines 44, 46 during a dynamic impact event. In this way, the component parts of the present invention are configured to deflect in specific areas to reduce energy and allow for localized and controlled breakage in targeted areas of these components. The score lines 44, 46 are contemplated to be channels or notches disposed in the body portion of the panel 42 that extend into the panel 42 at least 1 mm or more. It is further noted that in order to maintain a pleasing aesthetic appearance of the headrest assembly 16, the score lines 44, 46 are disposed and visible on the inner surface 42B of the panel 42 only, and are not visible on the outer surface 42A.

As further shown in FIGS. 2 and 3, the rear cover 40 includes integrally molded attachment features 48 which outwardly extend from the inner surface 42B of the rear cover 40 into the interior space 28 defined by the headrest housing 18. In assembly, the integrally molded attachment features 48 are configured to couple the rear cover 40 to a structural component of the headrest assembly 16. The structural component may include a substantially horizontal support bar having downwardly extending legs that are configured to be received in a frame member disposed within the seatback 14 of the vehicle seat 10. The score lines 44, 46 of the rear cover 40 define a deflectable or deformable lower portion 42C of the rear cover 40. This lower portion 42C is configured to deform, flex, or otherwise deflect during a dynamic impact event, thereby absorbing energy that would otherwise be rebounded into the object imparting a force on the headrest assembly 16, such as a vehicle occupant. As such, the headrest housing 18, at rear cover 42, is flexible between at-rest and deformed conditions at deflectable lower portion 42C.

Figure 6:
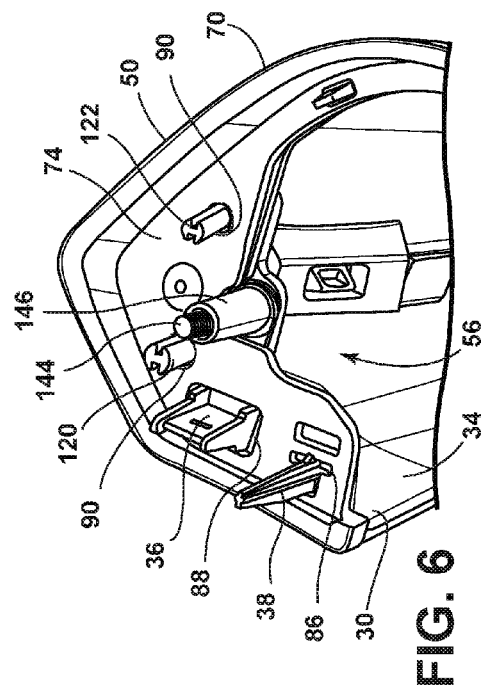
FIG. 6 is a bottom perspective view of the headrest housing of FIG. 4 taken at location VI.

With further reference to FIG. 3, the rear cover 40 is shown having clips 52 which downwardly extend from the deflectable lower portion 42C of the rear cover 40. The clips 52 are used to couple the rear cover 40 to the back panel 24 as best shown in FIG. 2, and further described below. The rear cover 40 further includes mounting features 54, which are used to couple the rear cover 40 to the trim ring 50. A number of mounting features 54 are used to couple the rear cover 40 to the trim ring 50 and are best shown in FIG. 6 as further described below. As further shown in FIG. 3, the front cover 30 includes clips 36 which extend downwardly from the first and second sides 32, 34 of the front cover 30 for coupling the front cover 30 to the trim ring 50. This coupling is also best shown in FIG. 6. The front cover 30 also includes mounting features 38 which are also used to locate and couple the front cover 30 to the trim ring 50. Reinforcement brackets 56 are used to couple the front and rear covers 30, 40 of the headrest housing 18 to the trim ring 50. Further description of the reinforcement brackets 56 is included below with specific reference to FIGS. 6 and 7.

Referring now to FIG. 4, the front and rear covers 30, 40 of the headrest housing 18 are shown coupled together by a plurality of clip members 58 which are disposed on the front cover 30 and received in clip receiving brackets 60 disposed on the rear cover 40. A plurality of alignment tabs 62 are also used to guide and reinforce the connection between the front and rear covers 30, 40 of the headrest housing 18. The trim ring 50 is shown as having a perimeter 70 having a plurality of landings extending inwardly therefrom. Specifically, the trim ring 50 includes first and second primary attachment landings 72, 74 disposed on opposite sides of the trim ring 50. First and second secondary attachment landings 76, 78 are disposed towards a rear portion of the perimeter 70, and a tertiary attachment landing 80 is disposed therebetween. As further shown in FIG. 4, a number of notches 82, 84 are shown disposed around the perimeter 70 of the trim ring 50. Specifically, notches 82 are disposed between the primary attachment landing 72 and secondary attachment landing 76, as well as primary attachment landing 74 and secondary attachment landing 78. Notches 84 are disposed along a rear portion of the perimeter 70 of the trim ring 50 and are positioned specifically between the secondary attachment landings 76, 78 and the tertiary attachment landing 80. As further shown in FIG. 4, the primary attachment landings 72, 74 include receiving apertures 86 and clip receiving apertures 88 for receiving the mounting features 38 and clips 36 of the front cover 30 in assembly. Further, various locating and mounting features 90 are disposed on the primary secondary and tertiary attachment landings 72, 74, 76, 78 and 80. These mounting features 90 are used to couple the front and rear covers 30, 40 of the headrest housing 18 to the trim ring 50 in assembly.

With further reference to FIG. 4, the notches 82, 84 disposed along the perimeter 70 of the trim ring 50 represent deflection points along the trim ring 50 where the trim ring 50 can bend, deform or otherwise deflect when a dynamic impact is realized on the trim ring 50. Further, the notches 82, 84 can also define breaking locations for controlled breaks in the trim ring 50 when a dynamic impact force of a sufficient degree is realized on the trim ring 50 to break the trim ring 50. Having the plurality of notches 82, 84 disposed on the perimeter 70 of the trim ring 50, the trim ring 50 provides for a point of energy absorption in an energy management system of the headrest assembly 16 of the vehicle seat 10 that can accommodate flexing movement of the back panel 24 and headrest housing 18.

Figure 5:
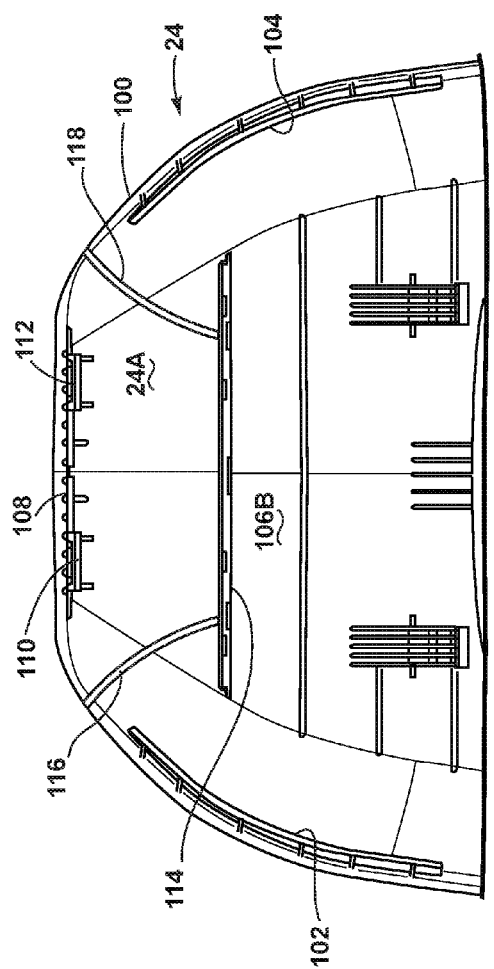
FIG. 5 is a front elevational view of the back panel of FIG. 2 with the headrest housing removed therefrom.

Referring now to FIG. 5, the back panel 24 is shown having an outer perimeter 100 disposed therearound. Attachment features 102, 104 are disposed along opposite sides of the outer perimeter 100 and are generally used to couple the back panel 24 to a support structure for the front cushioned portion 26 of the seatback 14. In the embodiment shown in FIG. 5, the back panel 24 includes a B-side or inner surface 106B and further includes an A-side surface 106A, as best shown in FIG. 1B. On the inner surface 106B, an attachment bracket 108 is shown disposed along an upper portion of the outer perimeter 100 of the back panel 24. The attachment bracket 108 includes first and second clip receiving apertures 110, 112 which are used to couple to the downwardly extending clips 52 of the rear cover 40 in a manner best shown in FIG. 2. In this way, the deflectable portion 42C of the rear cover 40 couples to the back panel 24.

As further shown in FIG. 5, the inner surface 106B of the back panel 24 includes a substantially horizontal score line 114 extending across a back portion thereof. Extending upwardly at an angle from the score line 114, angled score lines 116, 118 are disposed extending from the horizontal score line 114 towards the outer perimeter 100 of the back panel 24. Together, the score lines 114, 116 and 118 define a deflectable or deformable portion of the back panel 24 at the upper portion 24A thereof. Thus, the upper portion 24A of the back panel 24 is a deflectable portion due to the positioning of the score lines 114, 116 and 118. The score lines 114, 116 and 118 are contemplated to be disposed and visible only on the B-side or inner surface 106B of the back panel 24, such that the score lines 114, 116 and 118 are not visible on the A-side or outer surface 106A shown in FIG. 1B. The score lines 114, 116 and 118 are contemplated to be channels inwardly extending into a body portion of the back panel 24 about 1 mm or more. As such, the back panel 24 is a flexible member between at-rest and deformed conditions at deflectable upper portion 24C. Thus, in the embodiment shown in FIG. 2, the deflectable portion 24A of the back panel 24 is coupled to the deflectable portion 42C of the headrest housing 18 at the clips 52 of the rear cover 40 and the clip receiving apertures 110, 112 of the attachment bracket 108 of the back panel 24. Further, the trim ring 50 is disposed therebetween as shown in FIG. 2, such that deflectable trim ring 50 and the deflectable portions 42C, 24A of the headrest housing 18 and back panel 24 are all coupled together to define the energy management system of the vehicle seat 10.

Figure 7:
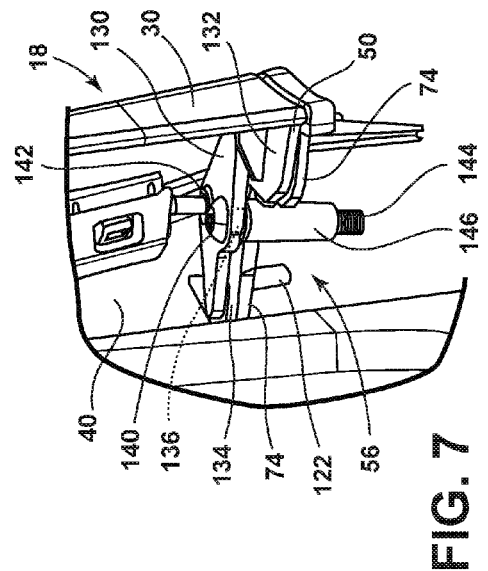
FIG. 7 is a front perspective view of the headrest housing of FIG. 3 taken at location VII.

Referring now to FIGS. 6 and 7, a closer view of a reinforcement bracket 56 is shown. As noted above, the reinforcement brackets 56 are disposed on opposite sides of the headrest housing 18 and are used to couple the front and rear covers 30, 40 of the headrest housing 18 with the trim ring 50. In the embodiment shown in FIGS. 6 and 7, one side of the headrest housing 18 is depicted, and it is contemplated that an opposite side of the headrest housing 18 substantially mirrors the configuration shown in FIGS. 6 and 7. Specifically, the embodiment shown in FIG. 6 includes a bottom perspective view of the second primary landing 74 of the trim ring 50. Mounting feature 38 of the front cover 30 is shown received through receiving aperture 86 of the trim ring 50. Mounting feature 38 includes a cross section that corresponds to the cross section of receiving aperture 86 of the trim ring 50 to help locate the front cover to the trim ring 50 in assembly. As further shown in FIG. 6, clip 36 of the front cover 30 is received through clip receiving aperture 88 of the trim ring 50 to positively couple the front cover 30 to the trim ring 50. At mounting features 90, mounting bosses 120, 122 are shown extending therethrough and are contemplated to be mounting bosses extending downwardly from the front and rear covers 30, 40 of the headrest housing 18, respectively.

With specific reference to FIG. 7, the reinforcement bracket 56 includes an upper abutment member or plate 130 that is configured to be received in the spacing of the headrest housing 18, such that the plate member 130 is closely received along sidewalls of the front and rear covers 30, 40 of the headrest housing 18. The front and rear covers 30, 40 include landing portions 132, 134, respectively, from which the mounting bosses 120, 122 downwardly extend. The plate member 130 of the reinforcement bracket 56 is disposed over portions of the landings 132, 134 of the front and rear covers 30, 40. The landing portions 132, 134 of the front and rear covers 30, 40 are generally disposed over the primary landing 74 of the trim ring 50. The plate member 130 includes an aperture 136 disposed therethrough for receiving a fastener 140. The fastener 140 includes a head portion 142 and a threaded shaft portion 144 that is threadingly received in a sleeve member 146 of the reinforcement bracket 56. The sleeve member 146 may further be received in a through aperture of a flag bracket of a headrest armature of the vehicle seat 10 in assembly, and a retaining nut is used to couple to the end of the threaded shaft portion 144 to retain the reinforcement bracket 56 in place. The reinforcement brackets 56 of the headrest assembly 16 are contemplated to couple and retain the front and rear covers 30, 40 of the headrest housing 18 in a coupled configuration with the trim ring 50, as well as a coupled arrangement with the headrest armature or support structure. With the headrest housing 18, trim ring 50 and back panel 24 coupled together, the present invention provides a system in which deflectable portions of the above identified components are coupled together in a configuration provided to absorb energy during a dynamic impact event.

Thus, as noted above, the present invention includes a vehicle seat 10 (FIG. 1A) that includes a headrest assembly 16 coupled to a back panel 24 with an impact energy management system incorporated therein. The impact energy management system is designed to provide flex in the headrest housing 18 and the back panel 24 at the deflectable portions thereof. This flexing movement is a movement contemplated to be independent of any movement of support structures for the headrest bun 22 that may be coupled to the attachment features 48 of the rear cover 40 shown in FIGS. 2 and 3. Thus, in during a dynamic impact event, a load is realized on the rear cover 40 at the upper portion thereof and transfers from the rear cover 40 to the front cover 30, trim ring 50 and back panel 24 from the lower deflectable portion 42C of the rear cover 40. As the load is realized on the rear cover 40, the deflectable portion 42C of the rear cover 40 deflects outwardly to the deformed condition from the at-rest condition due to the configuration of the score lines 44, 46. This deflection is carried from the rear cover 40 to the back panel 24, as coupled thereto, as the load decelerates into the back panel 24. Thus, the back panel 24 deflects or flexes at the deflectable upper portion 24C due to the configuration of the score lines 114, 116 and 118 of the back panel 24 from an at-rest condition to a deformed condition. The flexing of the back panel 24 and rear cover 40 may cause the trim ring 50 to flex or break at the notches 82, 84 disposed on the perimeter 70 thereof. The flexing of the back panel 24 and rear cover 40, and the distortion of the trim ring 50 provide for energy absorption during a dynamic impact event.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A headrest assembly, comprising:
a headrest bun;
a housing including a front cover coupled to a rear cover to define a hollow interior space therebetween, wherein the rear cover includes a panel having a plurality of score lines disposed on an inner surface thereof to define an outwardly deflectable lower portion of the panel, wherein the front and rear covers are rigid members having first and second inwardly extending landing portions disposed thereon with downwardly extending clips, and further wherein the housing is disposed externally to the headrest bun; and
a trim ring having front and rear portions, wherein the trim ring is coupled to a lower portion of the front cover at the front portion of the trim ring, and further wherein the outwardly deflectable lower portion of the panel is coupled to a deflectable portion of the trim ring disposed on the rear portion of the trim ring between first and second notches disposed along an outer perimeter of the trim ring, wherein the trim ring includes first and second primary attachment landings disposed at opposite ends of the trim ring and having planar body portions extending inwardly from the outer perimeter with clip receiving apertures disposed therethrough, wherein the downwardly extending clips of the front and rear covers are received in the clip receiving apertures, and wherein the trim ring further includes first and second secondary attachment landings, the first and second secondary attachment landings respectively positioned adjacent to the first and second primary attachment landings, and wherein the first and second secondary attachment landings each include planar body portions extending inwardly from the outer perimeter of the trim ring.

2. The headrest assembly of claim 1, including: third and fourth notches disposed on the outer perimeter of the trim ring between the first and second primary attachment landings and the first and second secondary attachment landings.

3. The headrest assembly of claim 2, wherein the trim ring includes a tertiary attachment landing extending inwardly from the outer perimeter of the trim ring.

4. The headrest assembly of claim 3, wherein the first and second notches of the trim ring are disposed between the first and second secondary attachment landings and the tertiary attachment landing of the trim ring.

5. The headrest assembly of claim 1, including:
one or more reinforcement brackets coupling the front cover and the rear cover to the trim ring.

6. The headrest assembly of claim 1, wherein the plurality of score lines includes both horizontal and vertical score lines extending into a body portion of the panel.

* * * * *